(12) United States Patent
Buse et al.

(10) Patent No.: US 8,579,254 B2
(45) Date of Patent: Nov. 12, 2013

(54) ELECTROMAGNETIC DRIVE FOR A VALVE

(75) Inventors: Werner Buse, Kaarst (DE); Alvito Fernandes, Leverkusen (DE)

(73) Assignee: Pierburg GmbH, Neuss (DE)

( * ) Notice: Subject to any disclaimer, the term of this patent is extended or adjusted under 35 U.S.C. 154(b) by 31 days.

(21) Appl. No.: 13/382,291

(22) PCT Filed: Jun. 8, 2010

(86) PCT No.: PCT/EP2010/057992
§ 371 (c)(1),
(2), (4) Date: Jan. 5, 2012

(87) PCT Pub. No.: WO2011/003687
PCT Pub. Date: Jan. 13, 2011

(65) Prior Publication Data
US 2012/0104298 A1 May 3, 2012

(30) Foreign Application Priority Data
Jul. 8, 2009 (DE) .......................... 10 2009 032 365

(51) Int. Cl.
*F16K 31/02* (2006.01)

(52) U.S. Cl.
USPC ....... 251/129.17; 251/336; 335/237; 335/298

(58) Field of Classification Search
USPC ........ 251/129.15, 129.17, 336–337; 335/237, 335/298
See application file for complete search history.

(56) References Cited

U.S. PATENT DOCUMENTS

| | | | |
|---|---|---|---|
| 2,442,016 A * | 5/1948 | Poole | 335/237 |
| 3,921,670 A * | 11/1975 | Clippard et al. | 251/129.15 |
| 4,196,751 A * | 4/1980 | Fischer et al. | 251/129.16 |
| 4,463,332 A | 7/1984 | Everett | |
| 4,468,643 A * | 8/1984 | Barger | 335/298 |
| 4,610,428 A * | 9/1986 | Fox | 335/237 |
| 4,932,439 A * | 6/1990 | McAuliffe, Jr. | 251/129.18 |
| 4,954,799 A | 9/1990 | Kumar | |
| 5,110,087 A | 5/1992 | Studtmann et al. | |
| 5,158,263 A * | 10/1992 | Shimizu et al. | 251/129.17 |

(Continued)

FOREIGN PATENT DOCUMENTS

| | | |
|---|---|---|
| DE | 40 23 826 A1 | 1/1992 |
| DE | 41 10 003 C1 | 7/1992 |

(Continued)

OTHER PUBLICATIONS

English Translation of DE4110003, Jul. 1992.*

*Primary Examiner* — John Bastianelli
(74) *Attorney, Agent, or Firm* — Norman B. Thot

(57) ABSTRACT

An electromagnetic drive for a valve includes a housing comprising at least one electromagnetic circuit comprising a coil wound onto a coil support, a valve closing member, at least one core, at least one magnetizable reflux member, an armature having an annular shape at least on a side facing away from the valve closing member, an adjustment device having an adjustment screw, and a device to fix the armature in a non-energized state. The armature moves between a first end position and a second end position so as to act at least indirectly on the valve closing member. The adjustment device adjusts a magnetic force. The adjustment screw is insertable through the at least the magnetizable reflux member or through the core into the armature. Supplying the coil with an electric current causes the armature to move into the first end position or into the second end position.

8 Claims, 2 Drawing Sheets

(56) References Cited

U.S. PATENT DOCUMENTS

| | | |
|---|---|---|
| 5,758,626 A | 6/1998 | Maley |
| 5,853,028 A * | 12/1998 | Ness et al. .................... 335/237 |
| 5,890,662 A * | 4/1999 | Dykstra ........................ 335/237 |
| 6,631,633 B1 | 10/2003 | Garg et al. |
| 6,659,424 B2 * | 12/2003 | Buse et al. ............... 251/129.15 |
| 7,350,763 B2 * | 4/2008 | Hofling .................... 251/129.15 |
| 2006/0145545 A1 | 7/2006 | Reichert et al. |
| 2009/0189105 A1 * | 7/2009 | Dayton ................... 251/129.15 |
| 2010/0155638 A1 | 6/2010 | Zurke |

FOREIGN PATENT DOCUMENTS

| | | |
|---|---|---|
| DE | 10 2007 002 153 B3 | 12/2007 |
| DE | 10 2007 028910 B3 | 5/2008 |
| DE | 10 2007 002465 A1 | 7/2008 |
| WO | WO 2004/044932 A1 | 5/2004 |

* cited by examiner

ELECTROMAGNETIC DRIVE FOR A VALVE

CROSS REFERENCE TO PRIOR APPLICATIONS

This application is a U.S. National Phase application under 35 U.S.C. § 371 of International Application No. PCT/EP2010/057992, filed on Jun. 8, 2010 and which claims benefit to German Patent Application No. 10 2009 032 365.1, filed on Jul. 8, 2009. The International Application was published in German on Jan. 13, 2011 as WO 2011/003687 A2 under PCT Article 21(2).

FIELD

The present invention provides an electromagnetic drive for a valve, comprising a housing that includes at least one electromagnetic circuit composed of a coil wound onto a coil support, an armature, at least one core, and at least one magnetizable reflux member, the armature being mounted so as to be movable between two final positions and at least indirectly acting on a valve closing member, there being provided a means/device to fix the armature in the non-energized state, where energization of the coil causes the armature to move into the first or second final position, and a means/device being provided for adjusting the magnetic force.

BACKGROUND

DE 10 2007 002 153 B3 describes an electromagnetic drive for a pressure control valve. Due to tolerances of component parts or a specific selection of materials, a dispersion of the magnetic force is inevitably caused which makes it necessary to adjust the magnetic force after assembly of the electromagnetic drive. DE 10 2007 002 153 B3 describes a mechanical adjustment wherein, with the aid of a setting screw, the bias force of a spring is set so that a specific additional magnetic force must be applied to move the armature from a first end position into a second end position. A disadvantage of this manner of adjustment is that once set, a constant biasing force will then be effective in each operational state of the electromagnetic drive, irrespective of the amount of the respective magnetic force. The solution described in DE 10 2007 002 153 B3 also requires an additional component part, i.e. the spring.

SUMMARY

An aspect of the present invention is to provide an electromagnetic drive which avoids the above outlined disadvantages and which can be produced in an advantageous manner with a minimum number of component parts.

In an embodiment, the present invention provides an electromagnetic drive for a valve which includes a housing comprising at least one electromagnetic circuit comprising a coil wound onto a coil support, a valve closing member, at least one core, at least one magnetizable reflux member, an armature having an annular shape at least on a side facing away from the valve closing member, an adjustment device having an adjustment screw, and a device configured to fix the armature in a non-energized state. The armature is configured so as to move between a first end position and a second end position so as to act at least indirectly on the valve closing member. The adjustment device is configured to adjust a magnetic force. The adjustment screw is configured to be insertable through the at least magnetizable reflux member or through the core into the armature. Supplying the coil with an electric current causes the armature to move into the first end position or into the second end position. The present invention thus makes it possible to directly influence the magnetic force by enlarging the transition faces for the magnetic field lines.

BRIEF DESCRIPTION OF THE DRAWINGS

The present invention is described in greater detail below on the basis of embodiments and of the drawings in which.

DETAILED DESCRIPTION

In an embodiment of the present invention, the armature can be provided at the end of the electromagnetic drive facing toward the valve closing member if the electromagnetic drive is to be used to control a pressure control valve. In an embodiment of the present invention, the reflux member can, for example, comprise, on the side directed toward the coil, a circumferential recess in the region of the transition of the magnetic field lines to the armature so as to prevent dispersion of the magnetic field lines in the transition region between the reflux member or the armature.

For support of the armature, the reflux member can comprise a slide bearing bushing. In an embodiment of the present invention, the adjustment screw can, for example, be arranged in the reflux member via a thread or a knurl.

In an embodiment of the present invention, a membrane can, for example, be provided which by a radially outward face is arranged in the housing and by a radially inward face is arranged on the valve closing member, so that the electromagnetic drive is sealed against the valve. In this manner, depending on the medium which is used in the to-be-controlled valve, contamination of the electromagnetic drive can be prevented. In an embodiment of the present invention, the membrane can, for example, have a resilient force fixing the armature in a first end position.

Figure 1:
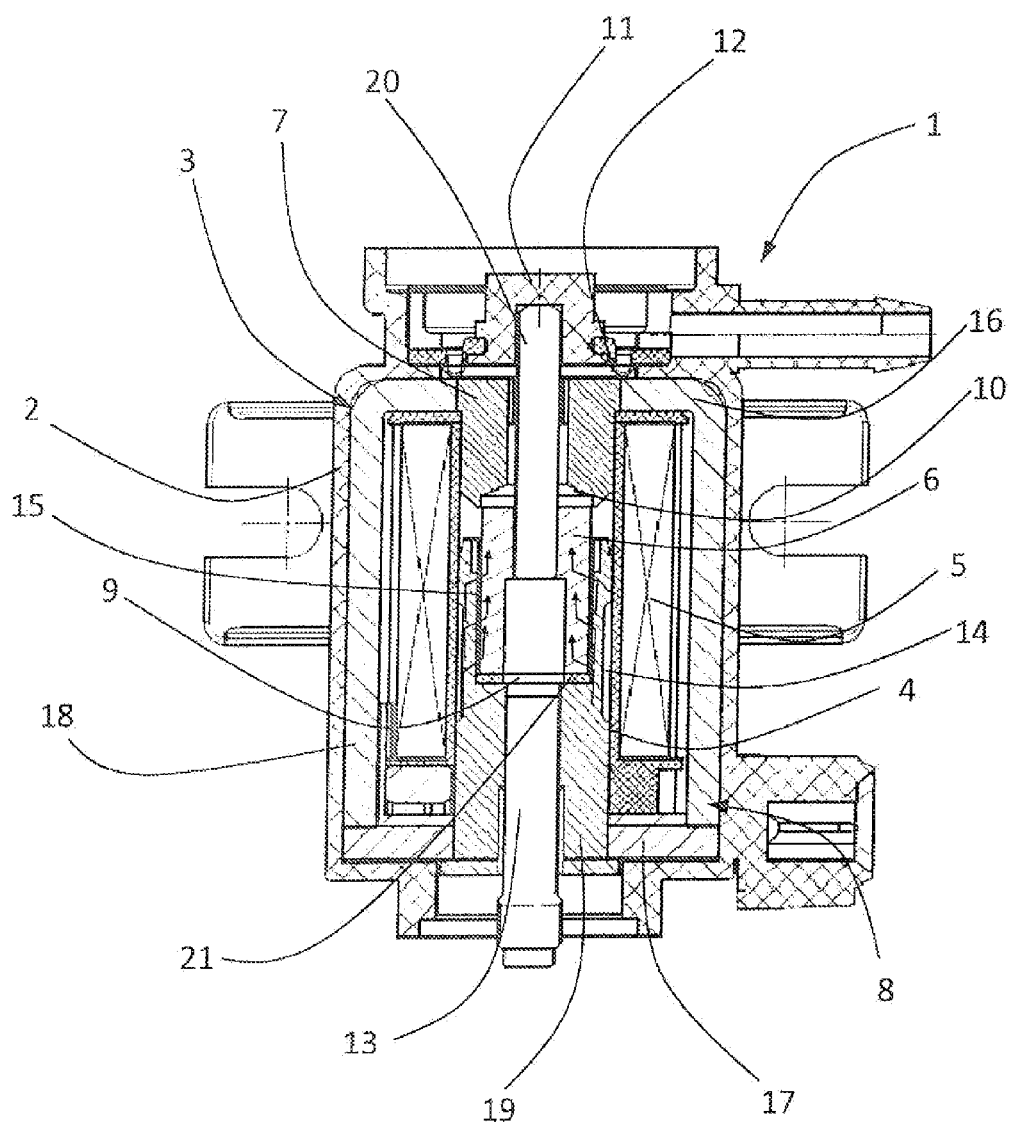
FIG. 1 is a schematic sectional view of an electromagnetic drive according to the present invention with the adjustment screw in a first position.

FIG. 1 shows an electromagnetic drive 1 according to the present invention which in the present case is operative to act on a valve closing member 11. FIG. 1 does not show the appertaining valve in greater detail. It should be noted, however, that the illustrated embodiment of the electromagnetic drive 1 is suited for a pressure control valve.

In the shown embodiment, the electromagnetic drive 1 comprises a housing 2 with an electromagnetic circuit 3, wherein a coil 5 is wound on a coil carrier 4. Further provided is a core 7 at the end of the electromagnetic drive 1 facing toward the valve closing member 11, said core being fastened to a reflux member 8.

In the shown embodiment, reflux member 8 substantially comprises three reflux metal sheets 16, 17, 18 and a reflux member 19. The reflux member 19 is arranged in the coil carrier 4 via locking hooks, which are not illustrated. The armature 6 has an annular shape at least on the side facing away from the valve closing member 11, and on the opposite side is connected to the valve closing member 11 via a valve stem 20.

In the shown embodiment, the armature 6 is fixed in a first, lower end position 9. This fixation is achieved by the spring force of a membrane 12, wherein said membrane 12 is arranged in the housing 2 by a radially outward face and is arranged on the valve closing member 11 by a radially inward face. It should be evident, however, that such a fixation can also be realized by means of suitable springs.

Armature 6, which is movable in axial direction, is supported in reflux member 19 via a slide bearing bushing 15 which in the present case is a DU bushing. In the first end position 9, there is also provided a non-magnetizable abutment element 21 for abutment of the armature 6 thereon in the first end position 9. To prevent dispersion of the magnetic field lines in the region of the transition from the reflux member 19 to the armature 6, a circumferential recess 14 is provided on that side of the reflux member 19 which is directed toward the coil 5.

When electric current is supplied to the electromagnetic drive 1, the magnetic flux lines will take the course represented in FIG. 1 so that the armature is pulled by core 7 into the second end position 10.

Figure 2:
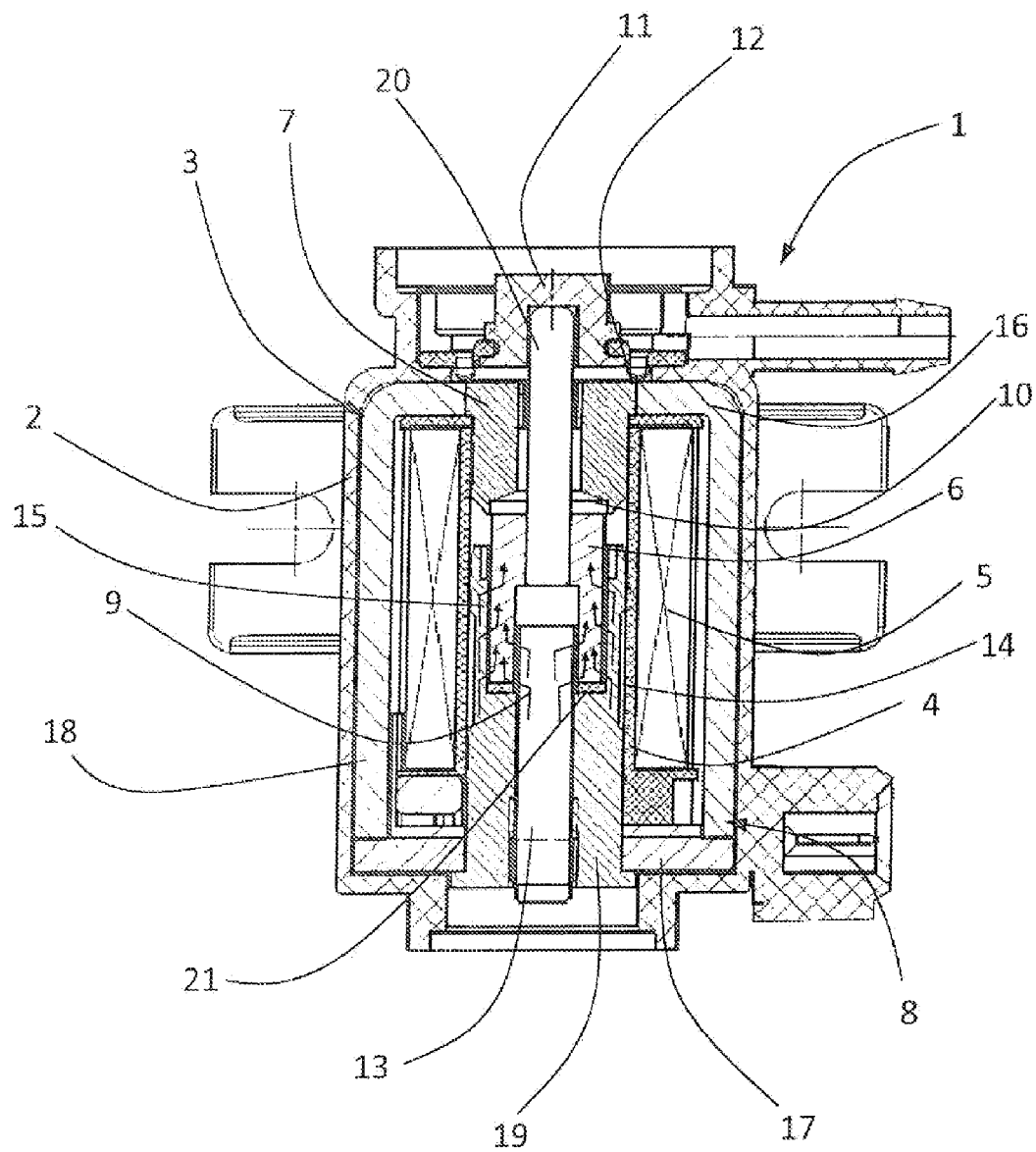
FIG. 2 is a schematic sectional view of an electromagnetic drive according to the present invention with the adjustment screw in a second position.

In case it becomes evident after assembly that the magnetic force resulting from a predetermined control current is not in the desired tolerance range, it is possible to perform a fine-adjustment of the electromagnetic drive with the aid of an adjustment screw 13. For this purpose, adjustment screw 13, which can be arranged in the reflux member 19 via a thread or also a knurl, can be moved in the direction of armature 6. Since armature 6 at least partially has an annular shape, the adjustment screw 13 can reach into the armature, as depicted in FIG. 2.

By the above measure, the transition region between reflux member 19 and armature 6 is considerably enlarged, resulting in an increase of the magnetic field lines, which in turn will lead to a higher magnetic force at a given control current.

After adjustment with the aid of adjustment screw 13, the electromagnetic drive 1 can be closed in the region of reflux member 19 by use of a lid, which is not illustrated in greater detail.

For preventing a deviation from the thus set position of the adjustment screw 13 in the reflux member, it is possible, for example, to apply welding spots in the region of the transition between the adjustment screw and the reflux member. Fixation by use of pins is also possible.

In case of a rapidly oscillating movement of armature 6, adjustment screw 13 can be provided to comprise a pressure compensation bore, which is not illustrated here. Adjustment screw 13 can also comprise a corresponding bore.

It should be evident that the adjustment screw 13 does not necessarily have to be provided with a thread or knurl.

The present invention is not limited to embodiments described herein; reference should be had to the appended claims.

What is claimed is:

1. An electromagnetic drive for a valve, the electromagnetic drive comprising:
    a housing comprising at least one electromagnetic circuit comprising:
        a coil wound onto a coil support,
        a valve closing member,
        at least one magnetizable reflux member,
        at least one core, the core being arranged only at an end of the electromagnetic driving facing the valve closing member and,
        an armature having an annular shape at least on a side facing away from the valve closing member, the armature being configured so as to move between a first end position and a second end position so as to act at least indirectly on the valve closing member,
        a device configured to fix the armature in a non-energized state, and
        an adjustment device having an adjustment screw, the adjustment device being configured to adjust a magnetic force, and the adjustment screw being configured to be insertable through the at least one magnetizable reflux member or through the core into the armature,
    wherein supplying the coil with an electric current causes the armature to move into the first end position or into the second end position.

2. The electromagnetic drive as recited in claim 1, wherein the core is arranged on an end of the electromagnetic drive facing toward the valve closing member.

3. The electromagnetic drive as recited in claim 2, wherein the at least one magnetizable reflux member includes, on a side directed toward the coil, a circumferential recess in a transition region of magnetic field lines to the armature.

4. The electromagnetic drive as recited in claim 3, further comprising a thread or a knurl, wherein the adjusting screw is arranged in the at least one magnetizable reflux member via the thread or the knurl.

5. The electromagnetic drive as recited in claim 1, further comprising a thread or a knurl, wherein the adjusting screw is arranged in the at least one magnetizable reflux member via the thread or the knurl.

6. The electromagnetic drive as recited in claim 1, wherein the at least one magnetizable reflux member includes a slide bearing bushing configured to support the armature.

7. The electromagnetic drive as recited in claim 1, further comprising a membrane comprising a radially outward face arranged in the housing and a radially inward face arranged on the valve closing member so as to seal the electromagnetic drive against the valve.

8. The electromagnetic drive as recited in claim 7, wherein the membrane includes a resilient force configured to fix the armature in the first end position.

* * * * *